United States Patent
Eggmann et al.

(10) Patent No.: US 9,908,271 B2
(45) Date of Patent: *Mar. 6, 2018

(54) METHOD FOR PRODUCING A PLASTIC CONTAINER HAVING A TWO-DIMENSIONALLY EXTENDING ELECTRONIC ELEMENT, PLASTIC CONTAINER PRODUCED ACCORDING TO SAID METHOD AND INJECTION MOLD FOR CARRYING OUT THE METHOD

(71) Applicant: Weidmann Medical Technology AG, Rapperswil (CH)

(72) Inventors: Kurt Eggmann, Schanis (CH); Karl Mazenauer, Jona (CH); Michael Akermann, Zurich (CH)

(73) Assignee: Weidman Medical Technology AG, Rapperswil (CH)

( * ) Notice: Subject to any disclaimer, the term of this patent is extended or adjusted under 35 U.S.C. 154(b) by 23 days.

This patent is subject to a terminal disclaimer.

(21) Appl. No.: 14/931,967

(22) Filed: Nov. 4, 2015

(65) Prior Publication Data

US 2016/0121527 A1 May 5, 2016

Related U.S. Application Data

(63) Continuation of application No. 13/695,977, filed as application No. PCT/CH2011/000103 on May 4, 2011, now Pat. No. 9,211,665.

(30) Foreign Application Priority Data

May 10, 2010 (CH) .......................... 718/10

(51) Int. Cl.
*B29C 45/14* (2006.01)
*B65D 25/20* (2006.01)
(Continued)

(52) U.S. Cl.
CPC .. *B29C 45/14065* (2013.01); *B29C 45/14836* (2013.01); *B65D 25/205* (2013.01);
(Continued)

(58) Field of Classification Search
CPC ............................................. B29C 2045/14122
See application file for complete search history.

(56) References Cited

U.S. PATENT DOCUMENTS

| 6,262,480 | B1 | 7/2001 | Ferri et al. |
| 7,070,053 | B1 | 7/2006 | Abrams et al. |
| 7,833,456 | B2 | 11/2010 | Farnworth |

(Continued)

FOREIGN PATENT DOCUMENTS

| FR | 2 796 880 A1 | 2/2001 |
| FR | 2 806 343 A1 | 9/2001 |

(Continued)

*Primary Examiner* — Hung V Ngo
(74) *Attorney, Agent, or Firm* — Sughrue Mion, PLLC (57) ABSTRACT

In order to produce a plastic container (1,2) having a planar electronic element (15), a planar electronic element (15) is introduced into a recess (29) of an inner face of a mold. The mold comprises an outer mold part (10) and a mold core (11), which form a mold cavity (12). Molten plastic material is injected into the mold cavity (12). After the subsequent cooling of the plastic material, mold removal is carried out. The recess (29) is arranged on an inner face (26) of the outer mold part (10). The molten plastic material is injected into the mold cavity in such a way that the molten plastic material flows substantially parallel along a surface (25) of the planar electronic element (15) facing the mold cavity (12). The planar electronic element (15) is an RFID inlay, for example. The planar electronic element does not require a protective casing and can be sprayed directly.

18 Claims, 5 Drawing Sheets

(51) Int. Cl.
  *B29L 31/00* (2006.01)
  *B29K 101/12* (2006.01)
(52) U.S. Cl.
  CPC .......... *B29C 45/14311* (2013.01); *B29C 2045/14106* (2013.01); *B29C 2045/14122* (2013.01); *B29C 2045/14155* (2013.01); *B29C 2045/14852* (2013.01); *B29K 2101/12* (2013.01); *B29L 2031/712* (2013.01); *B65D 2203/10* (2013.01)

(56) References Cited

U.S. PATENT DOCUMENTS

| | | | |
|---|---|---|---|
| 7,922,961 B2 * | 4/2011 | Chisholm | B29C 49/20 264/516 |
| 8,120,484 B2 * | 2/2012 | Chisholm | G06K 7/10178 215/201 |
| 2006/0238355 A1 | 10/2006 | Kokuryo et al. | |
| 2007/0182562 A1 | 8/2007 | Abbott et al. | |
| 2008/0129514 A1 | 6/2008 | Chisholm | |
| 2008/0131629 A1 | 6/2008 | Chisholm et al. | |
| 2008/0206510 A1 | 8/2008 | Huang | |
| 2008/0251968 A1 | 10/2008 | Misner et al. | |
| 2009/0086445 A1 | 4/2009 | Sugimoto et al. | |
| 2010/0052215 A1 | 3/2010 | Emond et al. | |
| 2011/0279002 A1 | 11/2011 | Han et al. | |

FOREIGN PATENT DOCUMENTS

| | | |
|---|---|---|
| WO | 93/14618 A1 | 7/1993 |
| WO | 93/24381 A1 | 12/1993 |
| WO | 2008/069846 A2 | 6/2008 |

* cited by examiner

METHOD FOR PRODUCING A PLASTIC CONTAINER HAVING A TWO-DIMENSIONALLY EXTENDING ELECTRONIC ELEMENT, PLASTIC CONTAINER PRODUCED ACCORDING TO SAID METHOD AND INJECTION MOLD FOR CARRYING OUT THE METHOD

The invention pertains to a method for producing a plastic container having a two-dimensionally extending electronic element by introducing the two-dimensionally extending electronic element into at least one recess of an inner face of a mold featuring an outer mold part and a mold core and forming a mold cavity, as well as injecting a molten plastic material into the mold cavity of the injection mold and subsequently cooling the plastic material.

In the prior art, it is known to provide containers with a two-dimensionally extending electronic element that contains data concerning the package and/or the content of the package or can be provided with such data. This data can be conventionally read in and read out in a contactless fashion. This makes it possible to ensure, in particular, the originality of the package and/or its content.

It is also known, for example, to provide containers with a barcode that contains the corresponding data. The barcode can be optically scanned. However, this has significant disadvantages. Such a barcode can, in particular, be manipulated in a relatively simple fashion. The optical scanning of a barcode furthermore cannot be ensured, for example, after it was subjected to soiling.

If the container is provided with a two-dimensionally extending electronic element such as, for example, an RFID tag, the readout is much easier and also more secure. For example, an RFID tag may be bonded onto a container. Such an RFID tag may be realized in the form of an RFID inlay. Such RFID inlays respectively have an RFID antenna that is arranged on an antenna foil and on which a chip module with a carrier foil is fixed. The chip module is preferably situated between the two aforementioned foils. A bonded RFID tag can be detached from the container at any time in a comparatively simple fashion and without being damaged.

In the prior art, it is also known to produce plastic containers by means of injection molding, wherein the two-dimensionally extending electronic element is injection-molded onto the container. This allows a more intimate connection between the two-dimensionally extending electronic element and the plastic of the container. In the prior art, such a method is disclosed in WO 2008/069846. In this method, an RFID inlay is accommodated in a plastic housing that forms a protective covering and features laterally protruding tabs on its circumference. The plastic housing is fixed in a recess of a mold core of a mold with these tabs. After the mold has been closed, molten plastic material is injected into the mold cavity through a nozzle. The plastic material is removed from the mold after it has cooled. The plastic housing with the RFID inlay accommodated therein is now arranged in the inner face, for example, on the bottom of the container. The plastic housing is intimately connected to the plastic of the container. This method is comparatively elaborate because the RFID inlay needs to be accommodated in the aforementioned plastic housing and this plastic housing then needs to be positioned and fixed in a recess of the mold core.

U.S. Pat. No. 7,070,053 discloses a method, in which an RFID tag is inserted into a holding ring that is mounted on the container by means of bendable tabs thereof. This type of mounting is also comparatively elaborate. In this case, the RFID tag is connected to the container in a comparatively loose fashion and basically could be detached from the container and manipulated.

The invention is based on the objective of developing a method of the initially cited type that can be carried out in an even easier and more cost-efficient fashion and makes it possible to produce a particularly secure container.

In a method of the initially cited type, this objective is attained in that the recess is arranged on an inner face of the outer mold part and the molten plastic material is injected into the mold cavity in such a way that it flows essentially parallel along a surface of the two-dimensionally extending electronic element that faces the mold cavity.

In the region of the recess, the plastic material therefore flows essentially parallel to the extent of the recess. Experiments have shown that the two-dimensionally extending electronic element is protected particularly well by the molten plastic material in such a recess and also not damaged or destroyed if it is not accommodated in a housing or a protective covering. The two-dimensionally extending electronic element, particularly an RFID (Radio Frequency Identification Device) inlay, therefore can be directly introduced into the recess without protective means. During the injection molding process, the molten plastic material flows along the electronic element, wherein this electronic element is held in the recess such that it cannot float away. The stress on the two-dimensionally extending electronic element is comparatively low because the molten plastic material consequently does not impact on the two-dimensionally extending electronic element at an acute angle. It is possible, in particular, to largely prevent any shearing forces from acting upon the narrow side of the two-dimensionally extending electronic element. Since the two-dimensionally extending electronic element or the RFID inlay respectively is directly injection-molded onto the container rather than in a protective covering, a much more intimate connection between the two-dimensionally extending electronic element and the plastic of the container is achieved. Consequently, the two-dimensionally extending electronic element injection-molded onto the container can hardly be detached without being damaged. This provides a very high security, in particular, with respect to ensuring the originality of the container or its content, respectively.

The inventive method is also suitable for large-scale production. As mentioned above, it is advantageous that the electronic element does not have to be accommodated in a protective covering. A corresponding production step therefore can be eliminated. Since no protective covering is used, the costs can also be lowered accordingly. Although the two-dimensionally extending electronic element consists, in particular, of an RFID inlay in this case, it would also be conceivable to utilize another electronic element that makes it possible to electronically read out and read in data in a contactless fashion or read out and read in data via an electric contact. The electronic element may be active or passive, i.e., it may be provided with or connected to its own energy source or be realized such that it can receive energy externally, e.g., from a field. It goes without saying that it is also possible to introduce and injection-mold several electronic elements into the mold cavity. These electronic elements essentially may be realized identically or differently. The method is particularly suitable for producing microwell plates, cuvettes, so-called cartridges for diagnostic purposes and containers for microfluidic applications. Such containers make it possible, for example, to establish so-called libraries for pharmaceutical research that contain biological samples over extended storage periods. The plastic material used basically may consist of any suitable thermoplastic polymer such as, e.g., polypropylene or polycarbonate. The inventive method makes it possible to produce a container, in which the two-dimensionally extending electronic element is arranged on the outside of the container. Such an electronic element is not subjected to the content of the container such that it is possible to prevent any contact that could alter the electronic element and also the content.

According to an enhancement of the invention, it is proposed to inject the molten plastic material into the mold cavity through a nozzle of the outer mold part. The nozzle, through which the molten plastic material is injected, therefore is situated in the outer mold part that also contains the aforementioned recess. Such an arrangement makes it possible, in particular, to inject the plastic material in such a way that it flows along the two-dimensionally extending electronic element in a particularly gentle fashion. It would naturally also be possible to provide more than one nozzle, through which the molten plastic material is injected. The nozzle could, in principle, also be arranged in the mold core.

According to an enhancement of the invention, it is proposed to realize the recess such that it essentially corresponds to the two-dimensionally extending electronic element. In this way, the two-dimensionally extending electronic element is, in essence, precisely positioned laterally. The recess and the two-dimensionally extending electronic element may be realized, for example, in a circular fashion. However, it would also be conceivable to use different shapes, wherein the recess and the two-dimensionally extending electronic element may be realized with a rectangular shape such as, for example, square.

According to an enhancement of the invention, it is proposed to realize the recess in the form of an elevation on the inner face of the outer mold part. The elevation consists, in particular, of a collar that surrounds the inserted two-dimensionally extending electronic element in a protective fashion. The surface of the two-dimensionally extending electronic element that faces the mold cavity may protrude over, be arranged flush with or recessed relative to this elevation. The aforementioned surface preferably is arranged essentially flush with the aforementioned elevation or slightly underneath this elevation. Since the two-dimensionally extending electronic element does not require a protective covering, the height of the two-dimensionally extending electronic element may be comparatively small and the elevation accordingly may have a comparatively small height, for example, from about 0.1 mm to about 0.5 mm. The elevation forms a protective wall or barrier of sorts and prevents the molten plastic material from acting upon the electronic element in a damaging fashion. The elevation does not necessarily have to be closed over its circumference, but preferably is provided at least at the locations, at which the plastic material flows against the electronic element. In a top view, for example, the elevation could be realized in an approximately U-shaped, sector-shaped, square, rectangular or bar-shaped fashion.

The two-dimensionally extending electronic element consists, in particular, of a passive electronic element such as, for example, an RFID inlay. Such RFID inlays are generally known and commercially available. In contrast to the prior art, they can also be introduced and injection-molded into the mold without a protective covering in the inventive method. The surface that faces the mold cavity consists, in particular, of a surface of the carrier foil, on which the chip module is arranged. In this case, the chip module is situated between this carrier foil and the antenna foil. In such a container, the carrier foil is rigidly connected to the plastic of the container. In order to connect the carrier foil to the container in a particularly rigid fashion, it may be plasma-treated, provided with an intermediate foil or with an adhesive. In the container produced in accordance with this method, the chip module is situated underneath the antenna foil that forms the outer face. An even superior protection can be ensured with an enhancement of the invention, according to which another plastic component is injected into the mold cavity. After the injection of the first component into the mold, another cavity is formed and a second component is injected therein. In this case, the two-dimensionally extending electronic element therefore is situated between two injected components. The two-dimensionally extending electronic element therefore is situated underneath the second plastic layer that forms the outer face or at least part of the outer face of the container in this case. The two plastic components may consist of identical or different materials.

The invention also pertains to a plastic container produced according to the inventive method. In this container, the two-dimensionally extending electronic element is arranged on the outer face. This provides the significant advantage that substances and the like situated in the container cannot have any effect on and therefore cannot damage the electronic element. Vice versa, the electronic element also cannot affect the container content, namely not even if the electronic element or RFID inlay is not arranged in a protective covering. On the outside, the two-dimensionally extending electronic element may be exposed or covered with at least one other injected plastic component. If the two-dimensionally extending electronic element is exposed, for example, it may be arranged flush with the outer face of the container. As mentioned above, the two-dimensionally extending electronic element preferably is directly injection-molded onto the container and therefore not arranged in a protective covering or the like. For example, the carrier foil of the chip module is injection-molded on the container and the antenna foil forms the outer face. Such a two-dimensionally extending electronic element is arranged, in particular, on a bottom of the container such as, for example, on the bottom of a cuvette, a microwell plate or a cartridge. The container may be entirely or partially made of plastic.

The invention also pertains to an injection mold for carrying out the inventive method. The mold of such an injection mold is essentially formed by an outer mold part and a mold core. One of these two mold parts usually is stationary and the other mold part is movable. The two-dimensionally extending electronic element may be arranged in the stationary or in the movable mold part. The recess for accommodating the two-dimensionally extending electronic element is situated in the outer mold part. The outer mold part at least partially forms the outer face of the container. The mold core, in contrast, at least partially forms the recess or the recesses of the container.

According to an enhancement of the invention, the recess, into which the two-dimensionally extending electronic element is introduced, may feature elements for fixing the two-dimensionally extending electronic element. For example, these elements may consist of snap-in elements such as, for example, snap-in tabs. The two-dimensionally extending electronic element therefore is snapped into the depression when it is introduced therein. The snap-in force may be comparatively low. It would also be possible to fix the two-dimensionally extending electronic element with an adhesive or by means of electrostatic forces. However, it would also be conceivable, for example, to fix the two-dimensionally extending electronic element with a vacuum.

In this case, the recess may feature, for example, openings that are connected to a vacuum pump via a corresponding line. The vacuum is neutralized after the molten plastic has cooled.

The recess may be realized in the form of an insert that is inserted into a corresponding bore of the outer mold part. According to an enhancement of the invention, this insert is exchangeable such that the recess can be easily adapted to different electronic elements. The insert may furthermore be movably supported in order to form a cavity in the outer mold part.

Other advantageous characteristics result from the dependent claims, the following description and the drawings.

Exemplary embodiments of the invention are described in greater detail below with reference to the drawings. In these drawings:

FIG. 8 shows a view of the underside of the container according to FIG. 5, and FIGS. 9a-9f schematically show sections through variations of elevations that respectively at least partially surround an electronic element.

Figure 1:
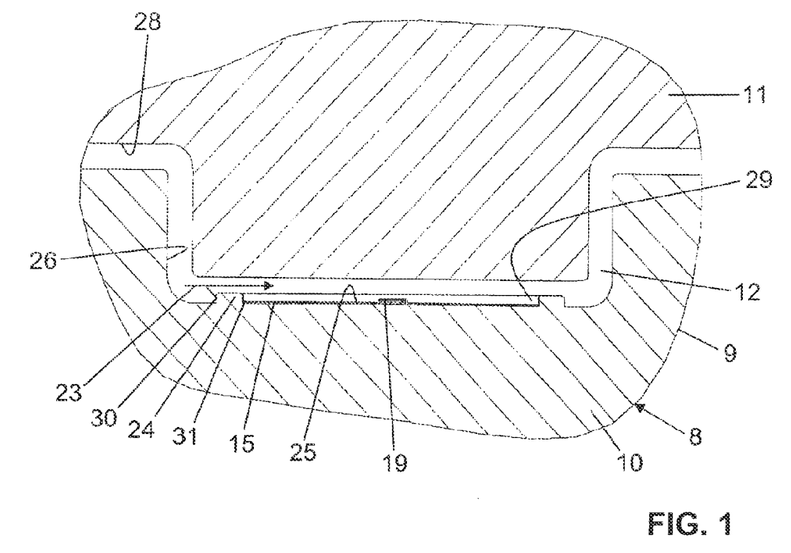
FIG. 1 shows a section through part of an injection mold.

The injection mold 8 illustrated in FIG. 1 features a mold 9, in which a mold cavity 12 is formed by an outer mold part 10 and a mold core 11. At least the outer mold part 10 or the mold core 11 is movable such that a plastic part being produced in the mold cavity 12 can be removed from the mold. The mold cavity 12 is only sectionally illustrated in this figure and formed by an inner face 26 of the outer mold part 10 and an inner face 28 of the mold core 11. The mold cavity 12 is realized in such a way that a plastic container 2 according to FIGS. 5 to 8 can be produced therein. The outer mold part 10 at least partially defines the outer face of the plastic container 2 and the mold core 11 at least partially defines the inner face of this container.

Figure 9A:
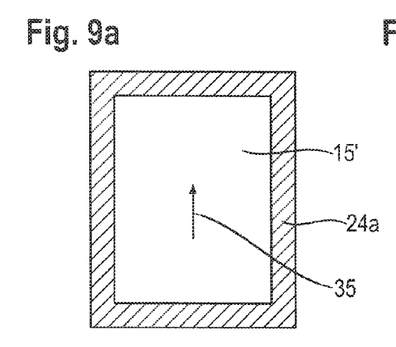
Figure 9B:
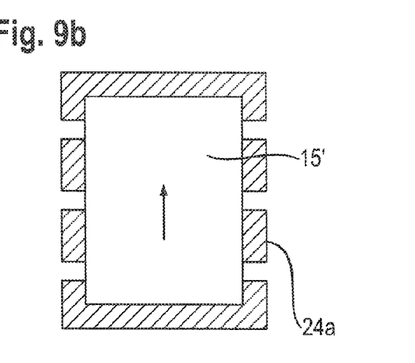
Figure 9C:
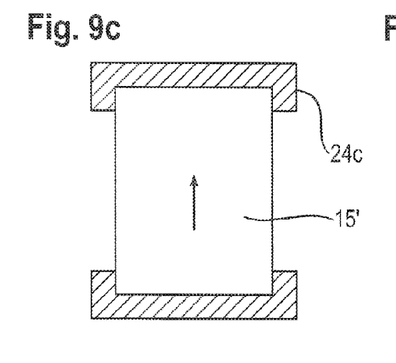
Figure 9D:
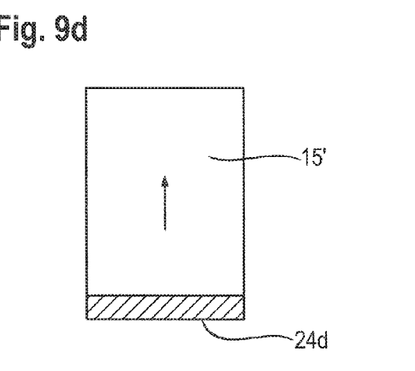
Figure 9E:
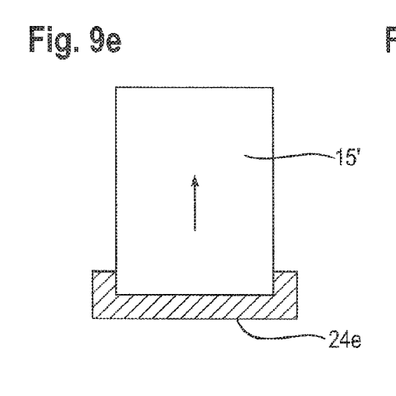
Figure 9F:
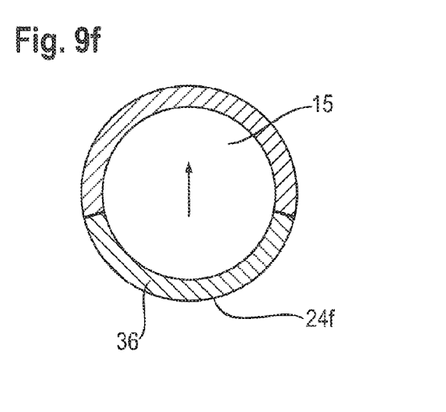

The inner face 26 of the outer mold part 10 contains a recess 29, in which a two-dimensionally extending electronic element 15 is arranged. The recess 29 is surrounded by an elevation 24 that encompasses the recess 29. The height of this elevation 24 lies, for example, in the range from about 0.1 mm to about 0.5 mm. The elevation may be closed over its circumference although it is also possible to realize an embodiment, in which the elevation 24 is laterally open. The elevation 24 has the function of a protective wall or barrier that prevents the molten plastic material flowing into the cavity 12 from damaging the two-dimensionally extending electronic element 15. The recess 29 is arranged in such a way that the molten plastic material flows essentially parallel along the electronic element 15. In FIG. 1, the arrow 23 indicates the direction, in which the molten plastic material flows along the electronic element 15. The elevation 24 stops the inflowing molten plastic material before it reaches the electronic element 15 at a lateral surface 30 of the elevation 24. This prevents the plastic material from entraining the two-dimensionally extending electronic element 15 on a narrow side 31 and therefore moving and rendering the two-dimensionally extending electronic element inoperative. The elevation 24 therefore is arranged, in particular, in the region indicated with the arrow 23 in FIG. 1. FIGS. 9a to 9f show variations of elevations 24a to 24f that are respectively intended for a rectangular electronic element 15' and a circular electronic element 15. The flow direction of the plastic material is indicated with an arrow 35. The elevation 24a is circumferentially closed while the elevations 24b and 24c are laterally interrupted. The elevation 24d is realized in a bar-shaped fashion and the elevation 24e is realized in a U-shaped fashion. The elevation 24f is realized with a circular shape, but higher in the inflow region than in the remaining region. An elevated region 36 that evidently faces the inflowing plastic material is indicated in FIG. 9f.

The two-dimensionally extending electronic element 15 has a surface 25 that faces the cavity 12. The molten plastic material inflowing in the direction of the arrow 23 covers this surface 25. After the plastic material has cured, it is injection-molded onto the two-dimensionally extending electronic element 15 on the surface 25. The two-dimensionally extending electronic element 15 therefore is rigidly connected to the plastic material. The two-dimensionally extending electronic element 15 is arranged on the outer face of the respective plastic part or container and, according to FIGS. 5, 7 and 8, surrounded by a recess 34 that corresponds to the elevation 24. Two-component or multi-component injection molding processes make it possible to cover the two-dimensionally extending electronic element 15 with at least one not-shown additional layer. After the first component has cured, an additional cavity is formed by moving or exchanging the outer mold part 10 and another component is then injected into this additional cavity. In this case, the two-dimensionally extending electronic element 15 is embedded between at least two layers. The two components may consist of the same plastic material or of different plastic materials. Such an embedded two-dimensionally extending electronic element 15 is particularly well protected against environmental influences and also cannot be removed or damaged.

Figure 2:
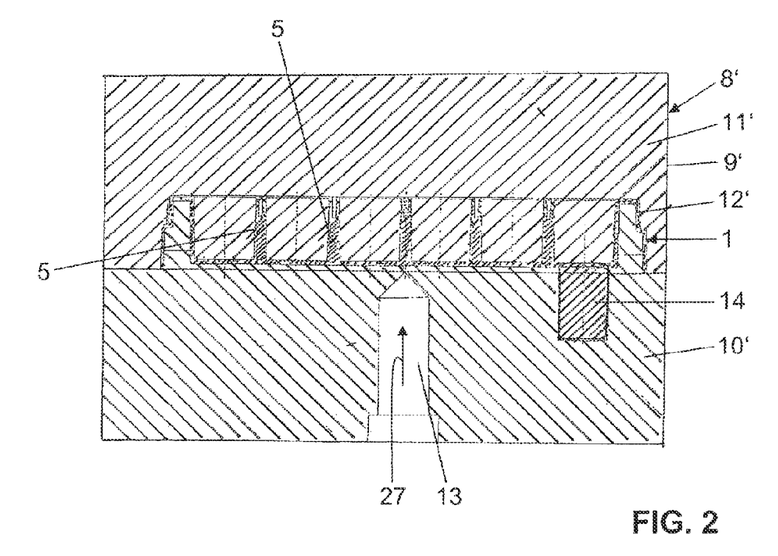
FIG. 2 shows a section through a mold of an injection mold after the injection of a molten plastic into the mold cavity.
Figure 3:
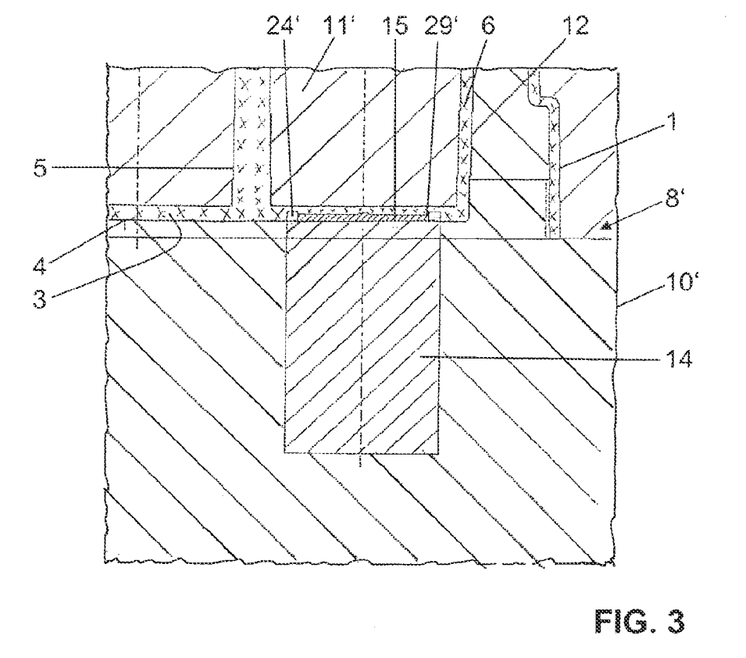
FIG. 3 shows a section through an enlarged part of the mold according to FIG. 2.

FIGS. 2 and 3 show an injection mold 8' for producing a plastic container 1. According to FIG. 3, this plastic container 1 features a bottom wall 3 and a side wall 6. These walls 3 and 6 form several recesses 5 that serve, for example, for accommodating not-shown substances, samples and the like. The container 1 may be provided with a not-shown cover or lid. The bottom wall 3 has an underside 4, on which a two-dimensionally extending electronic element 15 is arranged. FIGS. 2 and 3 show the plastic container 1 after the curing of the plastic material, but before the removal from the mold.

The recess 29', into which the two-dimensionally extending electronic element 15 is introduced, is formed by an insert 14 of the outer mold part 10'. The elevation 24' therefore forms part of the insert 14. The insert 14 can be exchangeable and be made of a different material than the remainder of the outer mold part 10'. However, the insert 14 is not absolutely necessary. The mold 9' also consists of the mold core 11' and the outer mold part 10' in this case. The molten plastic material is injected into the mold cavity 12' through a nozzle 13. The flow direction of the molten material in the nozzle 13 is indicated with the arrow 27. The flow direction is deflected by about 90° in the region of the cavity 12', in which the bottom wall 3 is produced. The flow direction therefore extends at an angle of about 90° to the direction of the arrow 27 in the region of the two-dimensionally extending electronic element 15. Consequently, the molten plastic material also flows essentially parallel to the plane of the two-dimensionally extending electronic element 15 in this case. The pressure of the molten plastic material in the cavity 12' lies, for example, in the range between 150 and 450 bar. The temperature of the molten plastic material in the cavity 12' lies, for example, in the range between 180° and 350° C. Due to the aforementioned flow direction in the region of the two-dimensionally extending electronic element 15, essentially no shearing forces act upon the narrow side 31 of the two-dimensionally extending electronic element 15. The electronic element therefore is not damaged and/or moved from its position by the inflowing plastic material. The two-dimensionally extending electronic element 15 therefore is not directly acted upon by the molten plastic material such that the risk of damages is significantly reduced.

Figure 4:
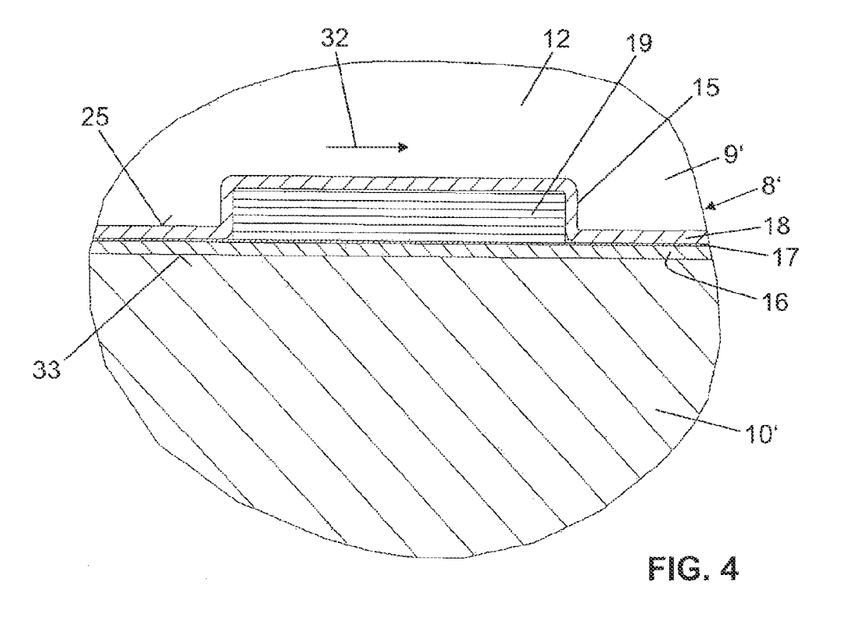
FIG. 4 shows a section through a highly enlarged part of the mold according to FIG. 1.
Figure 5:
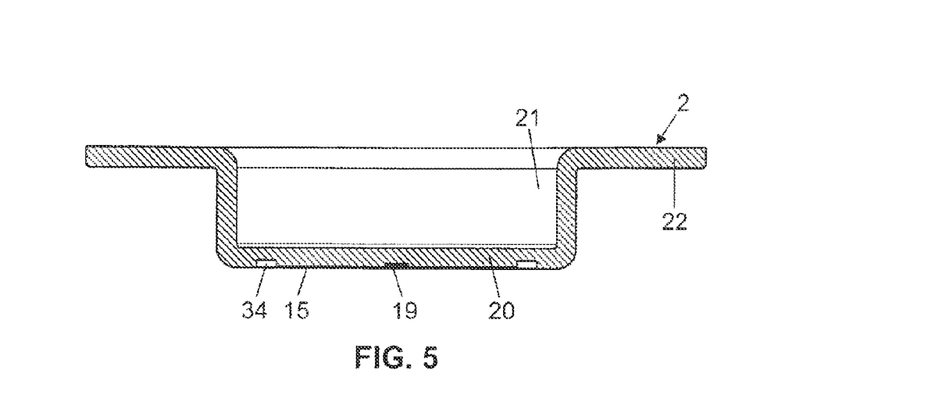
FIG. 5 shows a three-dimensional view of a container produced according to the inventive method.
Figure 6:
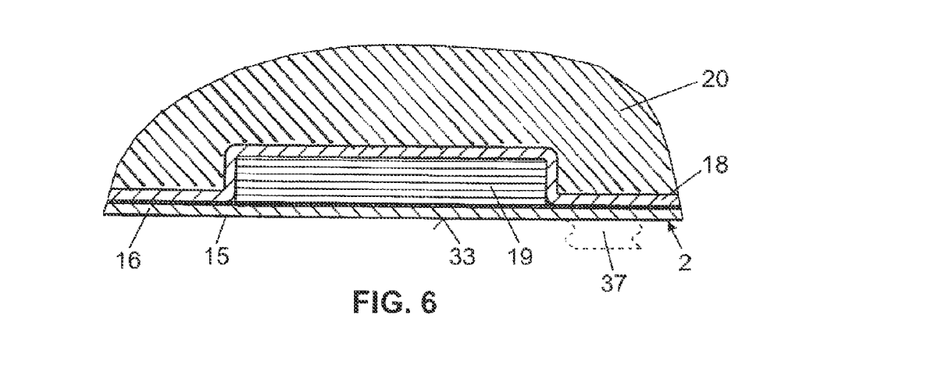
FIG. 6 shows a highly enlarged detail of FIG. 5.
Figure 7:
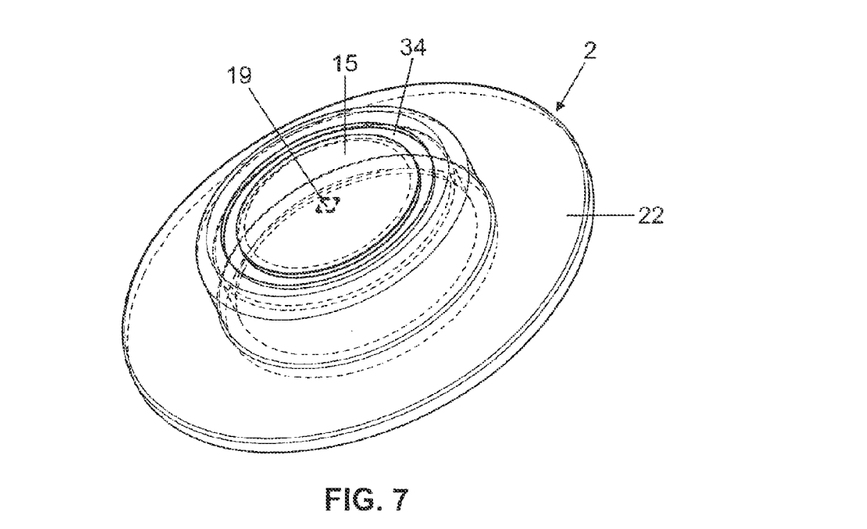
FIG. 7 shows a three-dimensional view of the container according to FIG. 5.
Figure 8:
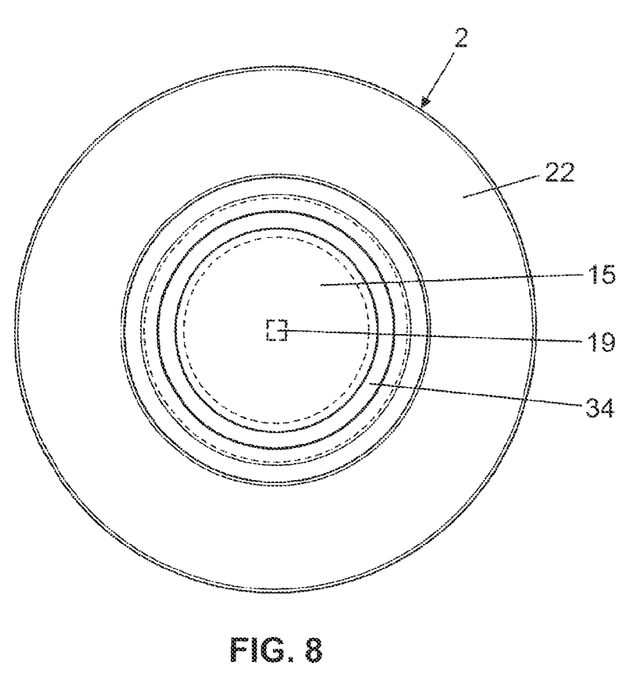

The two-dimensionally extending electronic element 15 consists, for example, of an RFID inlay with a chip 19 or a chip module that merely is schematically indicated in FIG. 4 and arranged between an antenna foil 16 and a carrier foil 18. An antenna 17 that is electrically connected to the chip 19 is conventionally arranged on the antenna foil 16. The chip 19 forms an elevation referred to the surface 25. This elevation protrudes into the mold cavity 12. In FIG. 4, this cavity 12 is not yet filled with the molten plastic material. During the injection of the molten plastic material, it flows in the direction of the arrow 32 and therefore essentially parallel to the plane of the two-dimensionally extending electronic element 15. The elevation 24' is not illustrated in FIG. 4. This elevation preferably also protrudes over the elevation formed by the chip 19. However, the chip 19 may also protrude over the elevation 24'.

The two-dimensionally extending electronic element 15 may be loosely introduced into the respective recess 29 or 29'. The respective recess 29 or 29' preferably is realized such that it essentially corresponds to the two-dimensionally extending electronic element 15. However, the two-dimensionally extending electronic element 15 may also be fixed in the respective recess 29 or 29'. This fixing of the two-dimensionally extending electronic element 15 could conceivably be realized with a clamping arrangement or with adhesion, for example, by means of an adhesive or by means of a vacuum. The insert 14 may be provided, for example, with not-shown bores, by means of which a vacuum can be applied to the underside of the two-dimensionally extending electronic element 15.

An increased adhesion of the two-dimensionally extending electronic element 15 on the plastic material can be achieved, for example, by roughening or otherwise treating the surface 25 with a plasma treatment. It is also possible to utilize an intermediate foil that is placed onto the surface 25. Due to such an improved adhesion, it is even more difficult to separate the two-dimensionally extending electronic element 15 from the container 1 without damages.

In the exemplary embodiments shown, the respective recess 29 or 29' is formed by a respective elevation 24 or 24'. However, it would also be conceivable to realize an embodiment, in which no such elevation 24 or 24' is provided. In this case, the respective recess 29 or 29' therefore is a recess in an essentially plane surface of the respective outer mold part 10 or 10'. However, the recess is in this case also arranged in such a way that the molten plastic material flowing into the cavity 12 flows essentially parallel over the two-dimensionally extending electronic element 15. The two-dimensionally extending electronic element 15 may be directly injection-molded onto the container without a protective covering. Since the molten plastic material does not directly flow against or act upon the two-dimensionally extending electronic element, it can be directly injection-molded onto the surface 25 and also onto an outer surface 33 without a protective covering. The insert 14 may be realized in a movable fashion in order to inject plastic material onto the outer surface 33. In this case, a movement of the insert 14 makes it possible to form a not-shown cavity, into which another molten plastic material can be injected. This additional plastic material then forms a layer that is injected onto the outer surface 33. This layer 37 is indicated with a broken line in FIG. 6 and may be opaque such that the two-dimensionally extending electronic element 15 is not visible on the plastic container 1. However, this layer 37 could also be transparent. The nozzle for injecting this plastic material may be arranged in the insert 14. The second plastic component is then injected through this not-shown nozzle. The second plastic component may also consist of any suitable thermoplastic polymer such as, for example, polypropylene or polycarbonate.

The container 2 illustrated in FIGS. 5 to 8 features a recess 21, for example, for accommodating samples. A laterally protruding collar 22 may be provided in order to attach a not shown lid or another cover. The electronic element 15 is evidently arranged on the outer side of a bottom wall 20 and may contain data concerning the samples stored in the container 2 and/or data concerning the container 2, as well as other data and information.

This data can be read and input with a suitable device in a contactless fashion and/or via a not shown electric contact. Since the electronic element 15 is arranged on the underside of the bottom wall 20 and therefore not in the recess 21, it is separated from the samples, substances and the like stored in the recess 21 by the bottom wall 20 such that a mutual chemical or physical influence can be largely precluded. Depending on the design of the elevation 24, the groove-shaped recess 34 completely or only partially surrounds the electronic element 15. It may be filled within injected plastic component or another applied layer. The surface 33 of the antenna foil 16 may be recessed into, protrude from or arranged flush with the outer face of a bottom wall. It may be exposed or, as mentioned above, also be arranged underneath a not-shown layer.

LIST OF REFERENCE SYMBOLS

1 Plastic container
2 Plastic container
3 Bottom wall
4 Underside
5 Recesses
6 Side wall
8 Injection mold
9 Mold
10 Outer mold part
11 Mold core
12 Mold cavity
13 Nozzle
14 Insert
15 Electronic element
16 Antenna foil
17 Antenna
18 Carrier foil
19 Chip
20 Bottom wall
21 Recess
22 Collar 23 Arrow
24 Elevation
25 Surface
26 Inner face
27 Arrow
28 Inner face
29 Recess
30 Lateral surface
31 Narrow side
32 Arrow
33 Surface
34 Recess
35 Arrow
36 Elevated region
37 Layer

The invention claimed is:

1. A method for producing a plastic container having a two-dimensionally extending electronic element in the form of an RFID inlay, the method comprising at least the following steps:
   a.) providing a two-dimensionally extending RFID inlay being realized without a protective covering, a mold and a first plastic component in the form of a molten plastic material, wherein the mold features an outer mold part with a first inner face and a mold core with a second inner face, said first and said second inner face together forming a mold cavity, and wherein the outer mold part comprises a recess being formed by a collar-shaped elevation of the first inner face;
   b.) introducing the two-dimensionally extending RFID inlay without a protective covering into the recess of the mold;
   c.) fixing the two-dimensionally extending RFID inlay in the recess;
   d.) injecting the first plastic component into the mold cavity of the mold and onto the two-dimensionally extending RFID inlay; and
   e.) subsequently to step d.), cooling the first plastic component.

2. The method according to claim 1, wherein the first plastic component is injected into the mold cavity through a nozzle of the outer mold part.

3. The method according to claim 1, wherein the recess is realized such that it essentially corresponds to the two-dimensionally extending RFID inlay.

4. The method according to claim 1, wherein the two-dimensionally extending RFID inlay is a passive electronic element.

5. The method according to claim 1, wherein at least one second plastic component is injected into the mold cavity.

6. The method according to claim 1, wherein the collar-shaped elevation is circumferentially closed.

7. A plastic container comprising
a wall formed by plastic material, and
a two-dimensionally extending electronic element in the form of an RFID inlay being arranged in or on the wall, wherein the plastic container is produced according to a method comprising at least the following steps:
   a.) providing a two-dimensionally extending RFID inlay being realized without a protective covering, a mold and a first plastic component in the form of a molten plastic material, wherein the mold features an outer mold part with a first inner face and a mold core with a second inner face, said first and said second inner face together forming a mold cavity, wherein the outer mold part comprises a recess being formed by a collar-shaped elevation of the first inner face;
   b.) introducing the two-dimensionally extending RFID inlay without a protective covering into the recess of the mold;
   c.) fixing the two-dimensionally extending RFID inlay in the recess;
   d.) injecting the first plastic component into the mold cavity of the mold and onto the two-dimensionally extending RFID inlay; and
   e.) subsequently to step d.), cooling the first plastic component.

8. The plastic container according to claim 7, wherein the two-dimensionally extending RFID inlay is arranged essentially flush with an outer face of the wall.

9. The plastic container according to claim 7, wherein the two-dimensionally RFID inlay is embedded between two layers that at least partially form the wall.

10. The plastic container according to claim 7, wherein it is a cuvette, a microtiter plate or a cartridge.

11. The plastic container according to claim 7, wherein the two-dimensionally extending RFID inlay comprises a surface that faces the mold cavity and that is arranged flush or recessed relative to the collar-shaped elevation.

12. The plastic container according to claim 7, wherein the fixing of the two-dimensionally extending RFID inlay in the recess is realized with a clamping arrangement or by an adhesive.

13. The plastic container according to claim 7, wherein the fixing of the two-dimensionally extending RFID inlay in the recess is realized by vacuum or by electrostatic forces.

14. The plastic container according to claim 7, wherein the collar-shaped elevation is circumferentially closed.

15. An injection mold comprising
an outer mold part having a first inner face, which features a recess being formed by a collar-shaped elevation of the first inner face for accommodating a two-dimensionally extending electronic element in the form of an RFID inlay being realized without a protective covering, the recess featuring elements for fixing the two-dimensionally extending RFID inlay, and
a mold core having a second inner face,
a mold cavity formed by said first inner face and said second inner face together, and
a nozzle for injecting molten plastic material into the mold cavity and onto the two-dimensionally extending RFID inlay accommodated in the recess.

16. The injection mold according to claim 15, wherein the recess is formed by an elevation that protrudes from the inner face of the outer mold part.

17. The injection mold according to claim 15, wherein the nozzle is arranged in the outer mold part.

18. The injection mold according to claim 15, wherein the collar-shaped elevation is circumferentially closed.

* * * * *